(12) United States Patent
Rothman et al.

(10) Patent No.: US 7,290,166 B2
(45) Date of Patent: Oct. 30, 2007

(54) ROLLBACK OF DATA

(75) Inventors: Michael A. Rothman, Puyallup, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 496 days.

(21) Appl. No.: 10/902,516

(22) Filed: Jul. 28, 2004

(65) Prior Publication Data

US 2006/0026319 A1 Feb. 2, 2006

(51) Int. Cl.
*G06F 11/00* (2006.01)
(52) U.S. Cl. .......................................... 714/6
(58) Field of Classification Search .................. 714/6, 714/15
See application file for complete search history.

(56) References Cited

U.S. PATENT DOCUMENTS

| | | | | |
|---|---|---|---|---|
| 5,745,672 A * | 4/1998 | Stiffler | | 714/6 |
| 5,845,326 A * | 12/1998 | Hirayama et al. | | 711/135 |
| 5,864,657 A * | 1/1999 | Stiffler | | 714/15 |
| 5,907,673 A * | 5/1999 | Hirayama et al. | | 714/16 |
| 5,923,832 A * | 7/1999 | Shirakihara et al. | | 714/37 |
| 5,938,775 A * | 8/1999 | Damani et al. | | 714/15 |
| 5,996,088 A * | 11/1999 | Frank et al. | | 714/6 |
| 6,052,799 A * | 4/2000 | Li et al. | | 714/13 |
| 6,088,773 A * | 7/2000 | Kano et al. | | 711/161 |
| 6,163,856 A * | 12/2000 | Dion et al. | | 714/4 |
| 6,401,216 B1 * | 6/2002 | Meth et al. | | 714/16 |
| 6,584,581 B1 * | 6/2003 | Bay et al. | | 714/16 |
| 6,751,749 B2 * | 6/2004 | Hofstee et al. | | 714/11 |
| 6,810,489 B1 * | 10/2004 | Zhang et al. | | 714/6 |
| 7,017,076 B2 * | 3/2006 | Ohno et al. | | 714/15 |
| 7,058,849 B2 * | 6/2006 | Erstad | | 714/5 |
| 2002/0174379 A1 * | 11/2002 | Korenevsky et al. | | 714/19 |
| 2003/0088807 A1 * | 5/2003 | Mathiske et al. | | 714/6 |
| 2004/0006723 A1 * | 1/2004 | Erstad | | 714/15 |
| 2005/0050386 A1 * | 3/2005 | Reinhardt et al. | | 714/13 |

OTHER PUBLICATIONS

IEEE Standard for Information Technology 802.3, Part 3: Carrier Sense Multiple Access with Collision Detection (CSMA/CD) Access Method and Physical Layer Specifications; Institute of Electrical and Electronics Engineers, Inc., Mar. 8, 2002; 33 pp.

Information systems—dpANS Fibre Channel Protocol for SCSI; draft proposed American National Standard, Rev. 012, Dec. 4, 1995; 75 pp.

Information technology—SCSI Controller Commands-2; draft proposed American National Standard, Rev. 4, Sep. 12, 1997; 24 pp.

(Continued)

*Primary Examiner*—Robert Beausoliel
*Assistant Examiner*—Amine Riad
(74) *Attorney, Agent, or Firm*—Konrad Raynes & Victor LLP; Janaki K. Davda

(57) ABSTRACT

Provided are a techniques for restoring data. Changed data is stored in a storage controller reserved area. In response to receiving a create checkpoint request, the data changed is promoted to a good status and a characteristic is associated with the promoted data to identify the promoted data as a checkpoint.

30 Claims, 10 Drawing Sheets

OTHER PUBLICATIONS

Serial ATA: High Speed Serialized AT Attachment; Serial ATA Workgroup, Rev. 1.0a, Jan. 7, 2003; 36 pp.

Virtual Infrastructure, webpage accessed Jun. 24, 2004; VMWare, Inc.; http://www.vmware.com/vinfrastructure; printed Jun. 24, 2004; 2 pp.

The Internet Society, "Small Computers Systems Interface protocol over the Internet (iSCSI) Requirements and Design Considerations," Network Working Group, RFC:3347, Jul. 2002; 23 pp.

Information Sciences Institute, "Internet Protocol: DARPA Internet Program Protocol Specification," RFC:791, Sep. 1981, 43 pp.

Information Sciences Institute, "Transmission Control Protocol: DARPA Internet Program Protocol Specification," RFC:793, Sep. 1981, 80 pp.

ASR Overview, webpage accessed Jun. 28, 2004; Microsoft Corporation; http://www.microsoft.com./windowsxp/home/using/productdoc/en/default.asp?url=WINDOWSXP/home/using/productdoc/en/asr_overview.asp; printed Jun. 28, 2004; 1 p.

Solution Providers Applaud Microsoft Connectix Acquisition, story dated Feb. 21, 2003; webpage accessed Jun. 28, 2004; CMP Channel Group; http://www.crn.com/sections/breakingnews/breakingnews.jhtml?articleld=18821842& requestid=640426; printed Jun. 28, 2004; 2 pp.

Anderson, Don, et al., eds. "PCI System Architecture," 4th ed., TOC pp. v-xlii, Intro. pp. 1-6; Chapter 1 pp. 7-13; Chapter 2 pp. 15-21; 1999.

\* cited by examiner

ROLLBACK OF DATA

BACKGROUND

Conventional systems provide rollback of data due to corrupted data or for other systems. For example, some conventional systems provide mirroring of data in which case a "mirror" copy of data is maintained so that if a first set of data is corrupted, the second set of data may be used to recover the first set of data. Mirroring requires a large amount of storage resources. For example, if the first set of data is stored in 100 megabytes, then another 100 megabytes are needed to store the second set of data.

Some conventional systems include operating system recovery services that intercept communications at a file system level, keep track of writes of data, and recover data based on this. However, not all writes are considered to be communications at the file system level, so certain writes are not tracked.

Also, conventional systems that provide recovery do not address a number of problems. A first problem not addressed arises when a file system corruption that occurs during computer system operation prevents the booting of the computer system after reset. A second problem not addressed arises when corruption of a critical operating system file, such as a registry hive file (e.g., for a Microsoft® Windows® operating system), prevents the operating system from running a number of utilities or checking services and may impact the ability of automated system recovery schemes that are used as a means of recovery from functioning properly.

In some conventional systems, an operating system may not have built-in or auxiliary utilities that support the rollback of configuration changes. That is, some operating systems do not have native recovery systems. Also, an operating system with rollback capabilities may not be capable of handling the first or second problems discussed above. In some cases, making a binary copy of a hard disk (e.g., in the case of mirroring) may be impractical and is typically infrequently done.

Furthermore, some virtualization products cannot handle the concept of an operating system rollback.

Thus, there is a need in the art for improved data recovery techniques.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Figure 1:
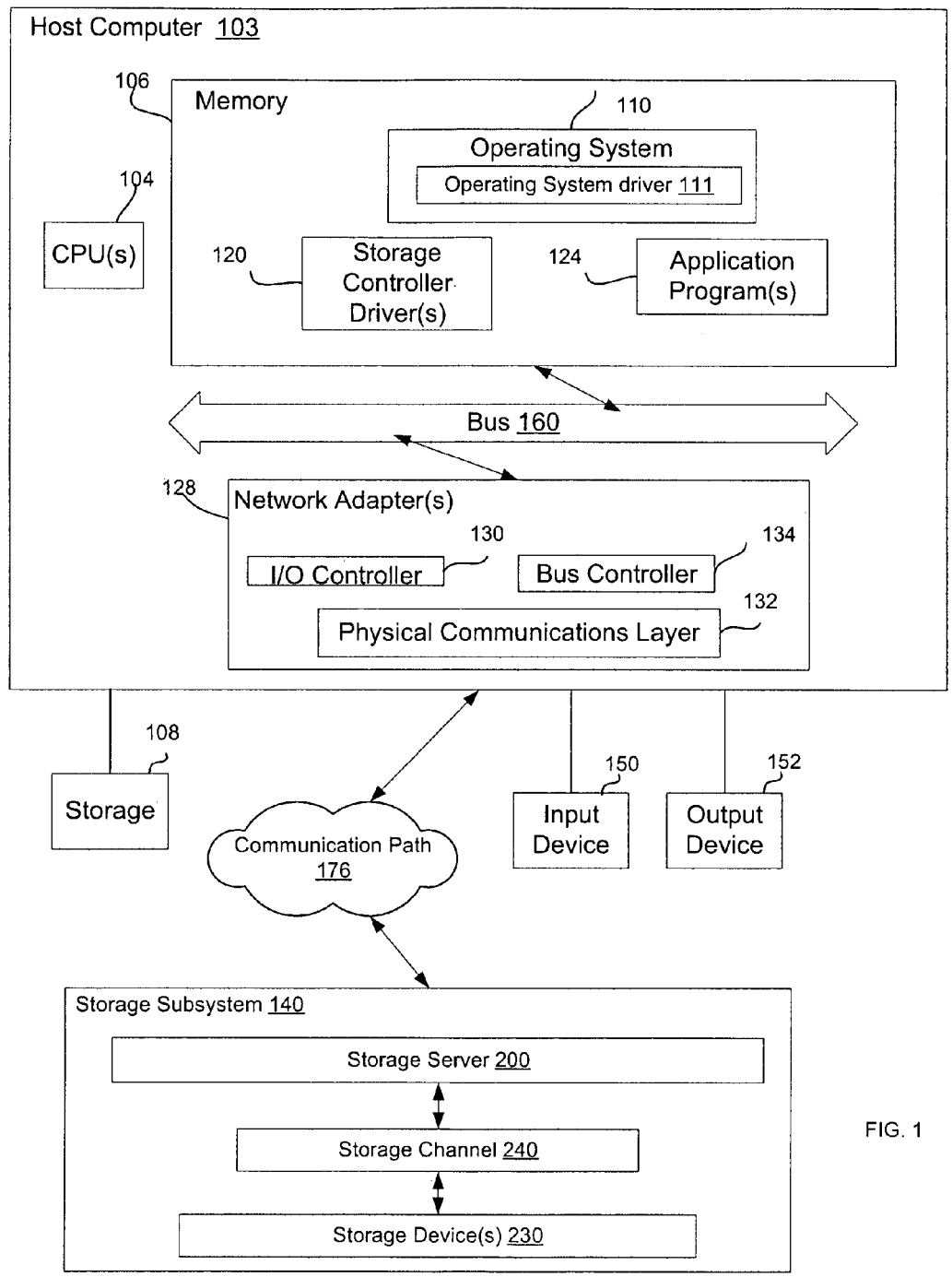
FIG. 1 illustrates details of a computing environment in which certain embodiments may be implemented.

FIG. 1 illustrates details of a computing environment in which certain embodiments may be implemented. A host computer 103 includes one or more central processing units (CPUs) 104, a volatile memory 106, non-volatile storage 108 (e.g., magnetic disk drives, optical disk drives, a tape drive, etc.), and one or more network adapters 128. Memory 106 stores an operating system 110. The operating system 110 may include operating system drivers, such as an operating system driver 111. One or more storage controller drivers 120 and one or more application programs 124 may be stored in memory 106 and are capable of transmitting and retrieving packets from remote storage subsystem 140 over a communication path 176 (e.g., a network).

The host computer 103 may comprise any computing device known in the art, such as a mainframe, server, personal computer, workstation, laptop, handheld computer, telephony device, network appliance, virtualization device, storage controller, etc. Any CPU 104 and operating system 110 known in the art may be used. Programs and data in memory 106 may be swapped into storage 108 as part of memory management operations.

The storage subsystem 140 includes a storage server 200 (i.e., a type of computing device) connected to a storage channel 240, which is connected to one or more storage devices 230 (e.g., disk drives that are part of a Redundant Array of Independent Disks (RAID) system). Storage devices 230 may also be referred to as an Input/Output (I/O) subsystem 230.

Each network adapter 128 includes various components implemented in the hardware of the network adapter 128. Each network adapter 128 is capable of transmitting and receiving packets of data over the communication path 176.

Each storage controller driver 120 executes in memory 106 and includes network adapter 128 specific commands to communicate with each network adapter 128 and interface between the operating system 110 and each network adapter 128. Each network adapter 128 or storage controller driver 120 implements logic to process packets, such as a transport protocol layer to process the content of messages included in the packets that are wrapped in a transport layer, such as Transmission Control Protocol (TCP) and/or Internet Protocol (IP) (Transmission Control Protocol DARPA Internet Program Protocol Specification, September 1981; Internet Engineering Task Force (IETF) Internet Protocol Version 4(IPV4)), the Internet Small Computer System Interface (iSCSI) (IETF February 2003), Fibre Channel (ISO 14165-1), or any other transport layer protocol known in the art. The transport protocol layer unpacks the payload from the received TCP/IP packet and transfers the data to a storage controller driver 120 to return to the application program 124. Further, an application program 124 transmitting data transmits the data to a storage controller driver 120, which then sends the data to the transport protocol layer to package in a TCP/IP packet before transmitting over the communication path 176.

A bus controller 134 enables each network adapter 128 to communicate on a computer bus 160, which may comprise any bus interface known in the art, such as any type of Peripheral Component Interconnect (PCI) bus (e.g., a PCI bus (PCI Special Interest Group, PCI Local Bus Specification, Rev 2.3, published March 2002), a PCI-X bus (PCI Special Interest Group, PCI-X 2.0a Protocol Specification, published 2002), or a PCI Express bus (PCI Special Interest Group, PCI Express Base Specification 1.0a, published 2002), published March 2002), Small Computer System Interface (SCSI) (American National Standards Institute (ANSI) SCSI Controller Commands-2 (SCC-2) NCITS.318: 1998), Serial ATA (SATA 1.0a Specification, published Feb. 4, 2003), etc.

The network adapter 128 includes a network protocol for implementing a physical communication layer 132 to send and receive network packets to and from remote data storages over the communication path 176. In certain embodiments, the network adapter 128 may implement the Ethernet protocol (IEEE std. 802.3, published Mar. 8, 2002), Fibre Channel (ISO 14165-1), or any other network communication protocol known in the art.

The network adapter 128 includes an Input/Output (I/O) controller 130. In certain embodiments, the I/O controller 130 may comprise Internet Small Computer System Interface (iSCSI controllers), and it is understood that other types of network controllers, such as an Ethernet Media Access Controller (MAC) or Network Interface Controller (NIC), or cards may be used.

The storage 108 may comprise an internal storage device or an attached or network accessible storage. Programs in the storage 108 may be loaded into the memory 106 and executed by the CPU 104. An input device 150 is used to provide user input to the CPU 104, and may include a keyboard, mouse, pen-stylus, microphone, touch sensitive display screen, or any other activation or input mechanism known in the art. An output device 152 is capable of rendering information transferred from the CPU 104, or other component, such as a display monitor, printer, storage, etc.

In certain embodiments, in addition to one or more storage controller drivers 120, the host computer 103 may include other drivers, such as a transport protocol driver (not shown) that performs the functions of the transport protocol layer.

The network adapter 128 may include additional hardware logic to perform additional operations to process received packets from the computer 103 or the communication path 176. Further, the network adapter 128 may implement a transport layer offload engine (TOE) to implement the transport protocol layer in the network adapter as opposed to the computer storage controller driver 120 to further reduce host computer processing burdens. Alternatively, the transport layer may be implemented in the storage controller driver 120.

Various structures and/or buffers (not shown) may reside in memory 106 or may be located in a storage unit separate from the memory 106 in certain embodiments.

Figure 2:
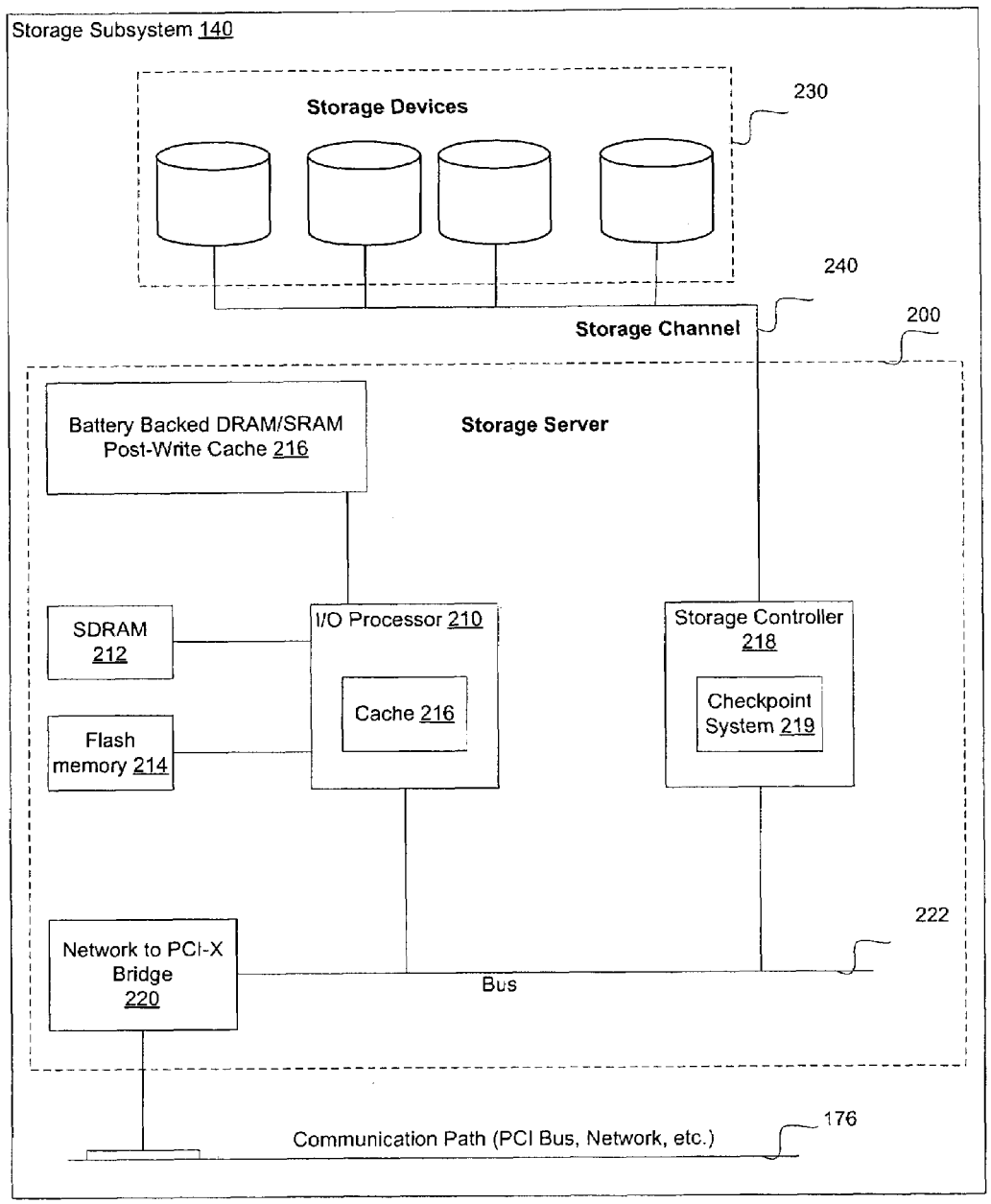
FIG. 2 illustrates further details of a storage subsystem in accordance with certain embodiments.

FIG. 2 illustrates further details of a storage subsystem 140 in accordance with certain embodiments. The storage subsystem 140 includes storage server 200, storage channel 240, and storage devices 230. The storage server 200 includes an Input/Output (I/O) processor 210. In certain embodiments, the storage devices 230 are controlled by the I/O processor 210. In certain embodiments, the storage devices 230 may be described as a Network Attached Storage (NAS) unit. In certain embodiments, the I/O processor 210 may be resident on a motherboard of the storage server 200 or may be part of a chipset.

The I/O processor 210 is an intelligent processor with an operating environment specialized for storage (e.g., the I/O processor 210 includes firmware/software for applications such as RAID and iSCSI systems). The I/O processor 210 manages data transfer from the storage devices 130 to the host computer 103 CPU 140 and vice-versa. A section of memory (cache 216) managed by the I/O processor 210 may be battery-backed. Cache 216 may be, for example, Dynamic Random Access Memory (DRAM) or Static Random Access Memory (SRAM).

Figure 3:
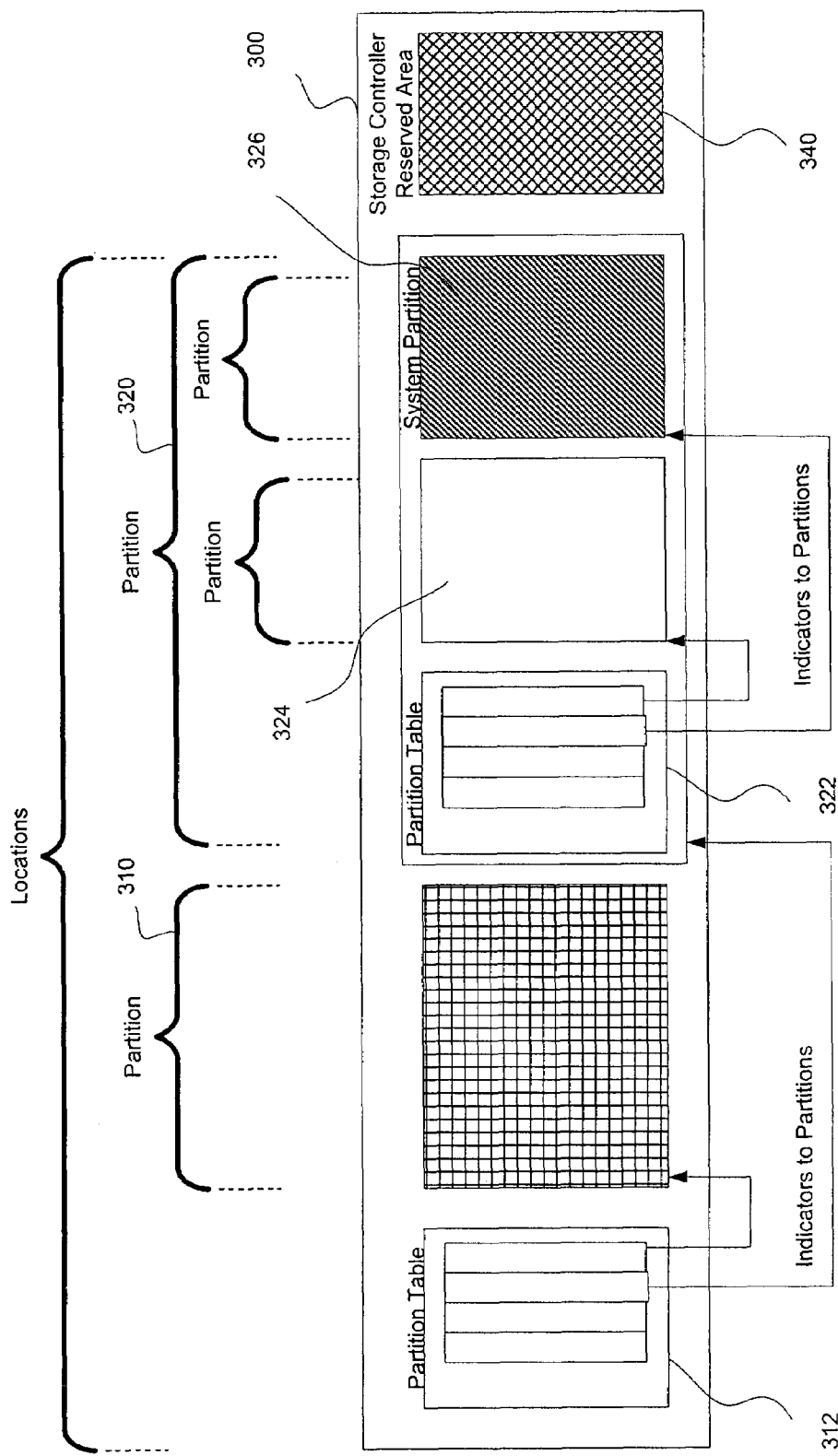
FIG. 3 illustrates details of a storage device in accordance with certain embodiments.

The storage server 200 also includes Synchronous Dynamic Random Access Memory (SDRAM) 212 and Flash memory 214 for use by the I/O processor 210. A storage controller 218 is used to connect to the storage channel 240. The storage controller 218 includes a checkpoint system 219 that is able to create and restore checkpoints. A checkpoint may be described as a set of data at a point in time that has been determined to be "good" data (e.g., not corrupted). In particular, when a checkpoint is created, a copy of the data is stored in a storage controller reserved area 340 (FIG. 3). In certain embodiments, the stored data is compressed in the storage controller reserved area 340. Although the checkpoint system 219 is illustrated as part of the storage controller 218, the checkpoint system 219 may alternatively be coupled to the host computer 103.

Also, a network to PCI-X bridge 220 is connected to the I/O processor 210 and channel controller 218 via a bus and is connected to host computer 103 via communication path 176 (e.g., a PCI bus, network, etc.).

FIG. 3 illustrates details of a storage device 300 in accordance with certain embodiments. For example, the storage device 300 may be a hard disk. The storage device 300 has locations (e.g., logical block addresses (LBAs)). The example storage device 300 has two partitions 310, 320 illustrated, although any number of partitions may be included in a storage device 300. Partition 320 includes two partitions 324, 326, and partition 326 is a system partition that may be used, for example, as a repository of platform specific drivers and utilities.

Partition table 312 includes indicators (e.g., pointers) to partitions 310 and 320. Partition table 326 includes indicators to partitions 324 and 326. Additionally, the storage device 300 includes a storage controller reserved area 340.

In certain embodiments, the checkpoint system 219 of the storage controller 218 uses a portion of a storage device 300 (i.e., storage controller reserved area 340) that is reserved for purposes of maintaining a sparse set of rollback data instances (i.e., checkpoints). By reserving a portion of the storage device 300, the checkpoint system 219 is able to intercept accesses to the storage device 300 and transfer data writes to the storage controller reserved area 340 of the storage device 300.

In certain embodiments, the checkpoint system 219 monitors storage device 300 I/O, and, when a write is attempted for a block, the original data for the block is moved to the storage controller reserved area 340. The storage controller reserved area 340 does not mirror the original storage device data, but stores a sparse list of changes that are logged (e.g., in a structure) in the storage controller reserved area 340. This achieves the ability to preserve data to an auxiliary store that is operating system and content format agnostic. In addition, the ability to have staged preservation of data (i.e., different checkpoints) allows creation of a host computer 103 policy that enables the host computer 103 to maintain a series of "last known good" checkpoints based on reboots. If a crash occurs or there is another reason to rollback, one of these "last known good" checkpoints may be selected so that rollback occurs to a point in time associated with the selected checkpoint. In certain embodiments, each checkpoint is associated with a log that lists changes.

The following is an example log structure definition in accordance with certain embodiments:

```
typedef struct {
UINT64    Starting_LBA_Entry;       // A beginning LBA number in a log
                                    (e.g. 0x4958).
UINT64    LBA_Count;                // Number of contiguous sectors in this entry;
                                    value is greater than zero.
UINT8     LBA_Content[LBA_Count][512]; // A double-array of preserved LBA
                                    content based on the number of
                                    LBA_Count in this entry.
} LOG_ENTRY;
```

FIGS. 4-10 will be used to illustrate an example implementation of embodiments. The example is merely provided to enhance understanding of embodiments and is not intended to limit the embodiments in any manner. FIGS. 4-10 illustrate partition 310 in various stages. Blank locations (e.g., block 402) indicate that there is no data in those locations (i.e., they are empty).

Figure 4:
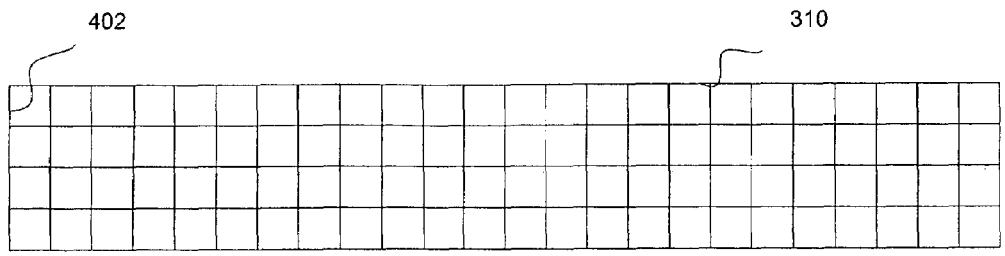
FIG. 4 illustrates a partition when the partition has been formatted in accordance with certain embodiments.

FIG. 4 illustrates partition 310 when the partition 310 has been formatted in accordance with certain embodiments. In certain embodiments, formatting a partition also adds a signature to the partition 310 to validate incoming commands. The signature is associated with the formatting process that deleted all data on partition 310. When a checkpoint is created, the signature is returned to the checkpoint system 219 at the storage controller 218. Then, incoming commands to the partition 310 from the checkpoint system 219 are expected to be submitted with the signature. If an incoming command does not have a valid signature, then the command may be ignored or error processing may occur.

Figure 5:
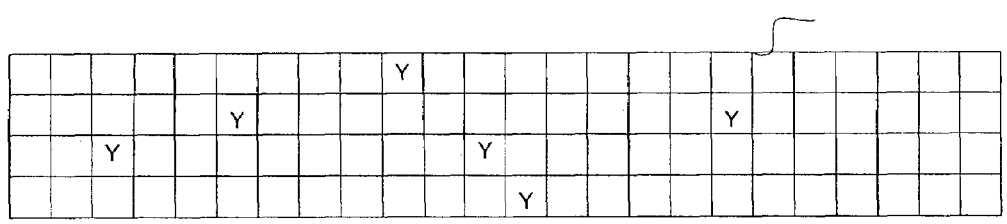
FIG. 5 illustrates that writes have occurred in a partition in accordance with certain embodiments.

FIG. 5 illustrates that writes have occurred in partition 310 in accordance with certain embodiments. In particular, the "Y" notations indicate locations that have been written. The locations with the "Y" notations are promoted to "good" data. In certain embodiments, promotion to "good" data is policy dependent. In certain embodiments, if an operating system 110 is successfully booted, then any changes pending promotion are promoted to "good" data.

Figure 6:
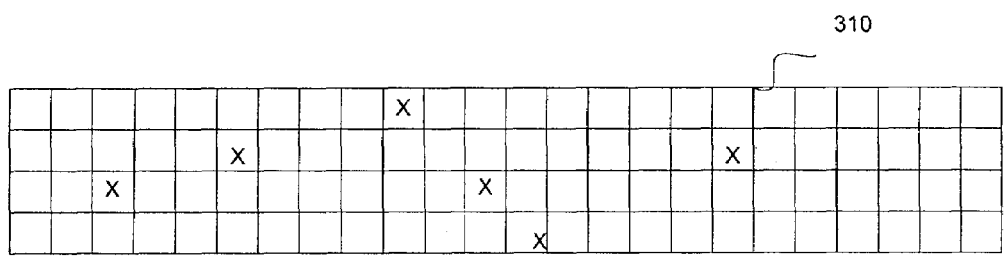
FIG. 6 illustrates that writes that have occurred in a partition have been promoted to a good status in accordance with certain embodiments.
Figure 7:
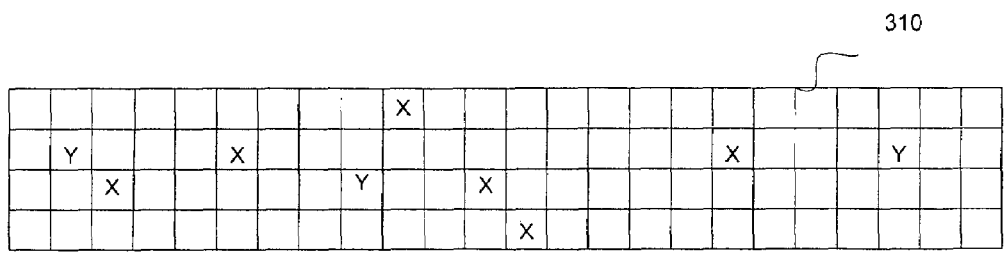
FIG. 7 illustrates that additional writes have occurred in a partition in accordance with certain embodiments.

FIG. 6 illustrates that writes that have occurred in partition 310 have been promoted to a good status in accordance with certain embodiments. In particular, the "X" notations indicate locations that have been written with "good" data. FIG. 7 illustrates that additional writes have occurred in partition 310 in accordance with certain embodiments. In particular, the "Y" notations indicate locations that have been written. Then, a create checkpoint request is received by the checkpoint system 219. In this example, the create checkpoint request was generated because the operating system 110 booted and the operating system driver 111 called the checkpoint system 219 with the appropriate signature (i.e., the signature associated with the formatting process) indicating that the boot was successful and a checkpoint is to be created. The operating system driver 111 knows whether data in partition 310 should be promoted to "good" data, and, by requesting creation of a checkpoint, indicates that this promotion should occur. In certain embodiments, the create checkpoint request may be generated automatically by the checkpoint system 219 either based on a period of time, a number of writes, certain conditions, or other factors.

Figure 8:
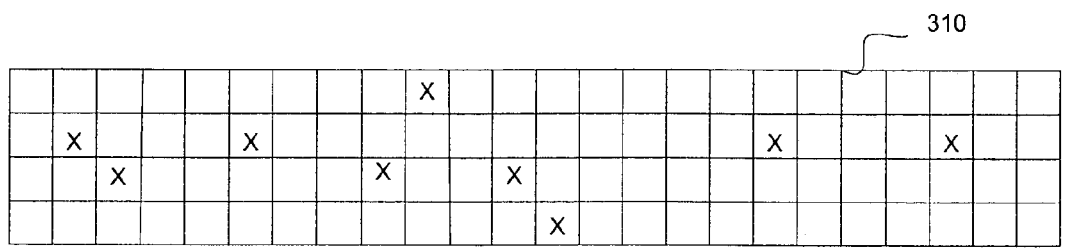
FIG. 8 illustrates a partition after a create checkpoint request has been processed in accordance with certain embodiments.
Figure 9:
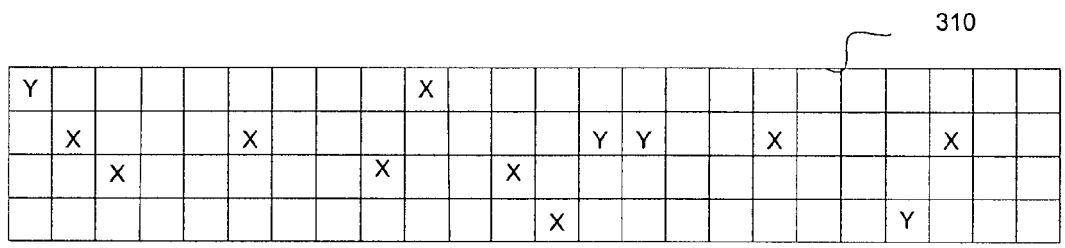
FIG. 9 illustrates that additional writes have occurred in a partition in accordance with certain embodiments.

FIG. 8 illustrates partition 310 after a create checkpoint request has been processed in accordance with certain embodiments. In particular, the "Y" notations for locations have been converted to "X" notations to indicate that the data in these locations are considered to be "good" data. FIG. 9 illustrates that additional writes have occurred in partition 310 in accordance with certain embodiments. In particular, the "Y" notations indicate locations that have been written. Then, a critical logical error is detected in this example. The checkpoint system 219 determines whether a critical logical error has occurred based on certain policies. An example policy may indicate that if a boot failure has occurred a predetermined number of times, then a critical logical error is deemed to have occurred and an automatic recovery from a previous checkpoint takes place.

Figure 10:
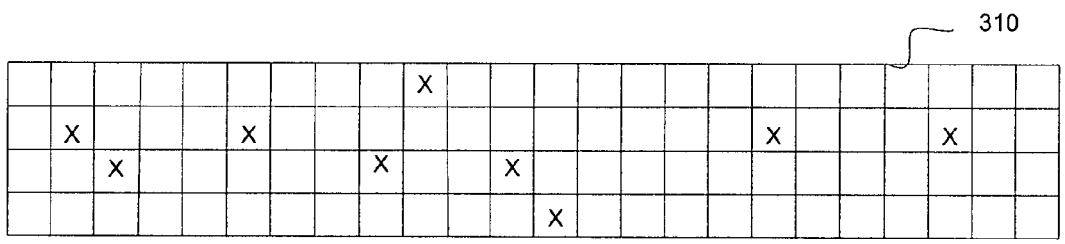
FIG. 10 illustrates a partition after a restore checkpoint request has been processed in accordance with certain embodiments.

The operating system driver 111 calls the checkpoint system 219 with the appropriate signature to restore the data to the previous checkpoint (i.e., the one created in FIG. 8 in this example). In this example, the location accesses were ones from the previously learned "good" boot for this partition 310, but an "all-clear" was not received (e.g., from an expected agent based on a policy). FIG. 10 illustrates partition 310 after a restore checkpoint request has been processed in accordance with certain embodiments. In particular, partition 310 has been returned to its condition in FIG. 8.

In certain embodiments, the checkpoint system 219 automatically returns to a valid checkpoint upon detecting the critical logical error. In certain embodiments, the checkpoint system 219 notifies a user (e.g., a system administrator) of the critical logical error, asks the user whether a rollback should be performed, and, if a rollback is to be performed, allows the user to select a checkpoint. This may be performed via a Graphical User Interface (GUI) provided by embodiments.

Figure 11:
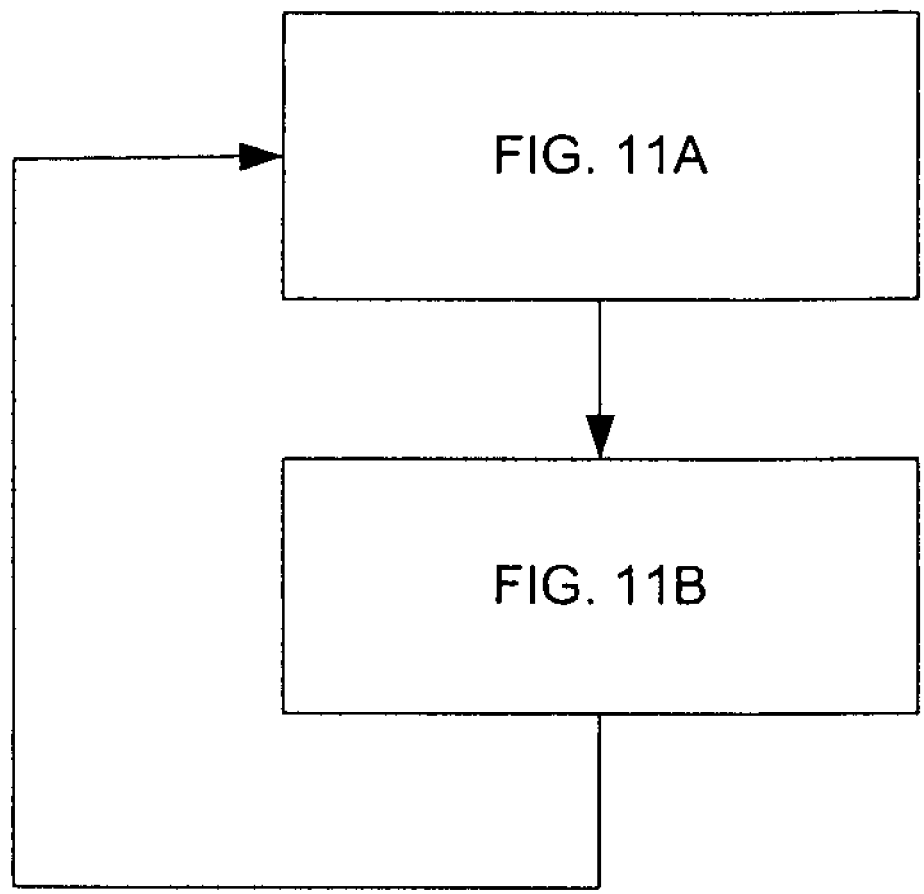
FIG. 11 illustrates a relationship between FIG. 11A and FIG. 11B.
Figure 11A:
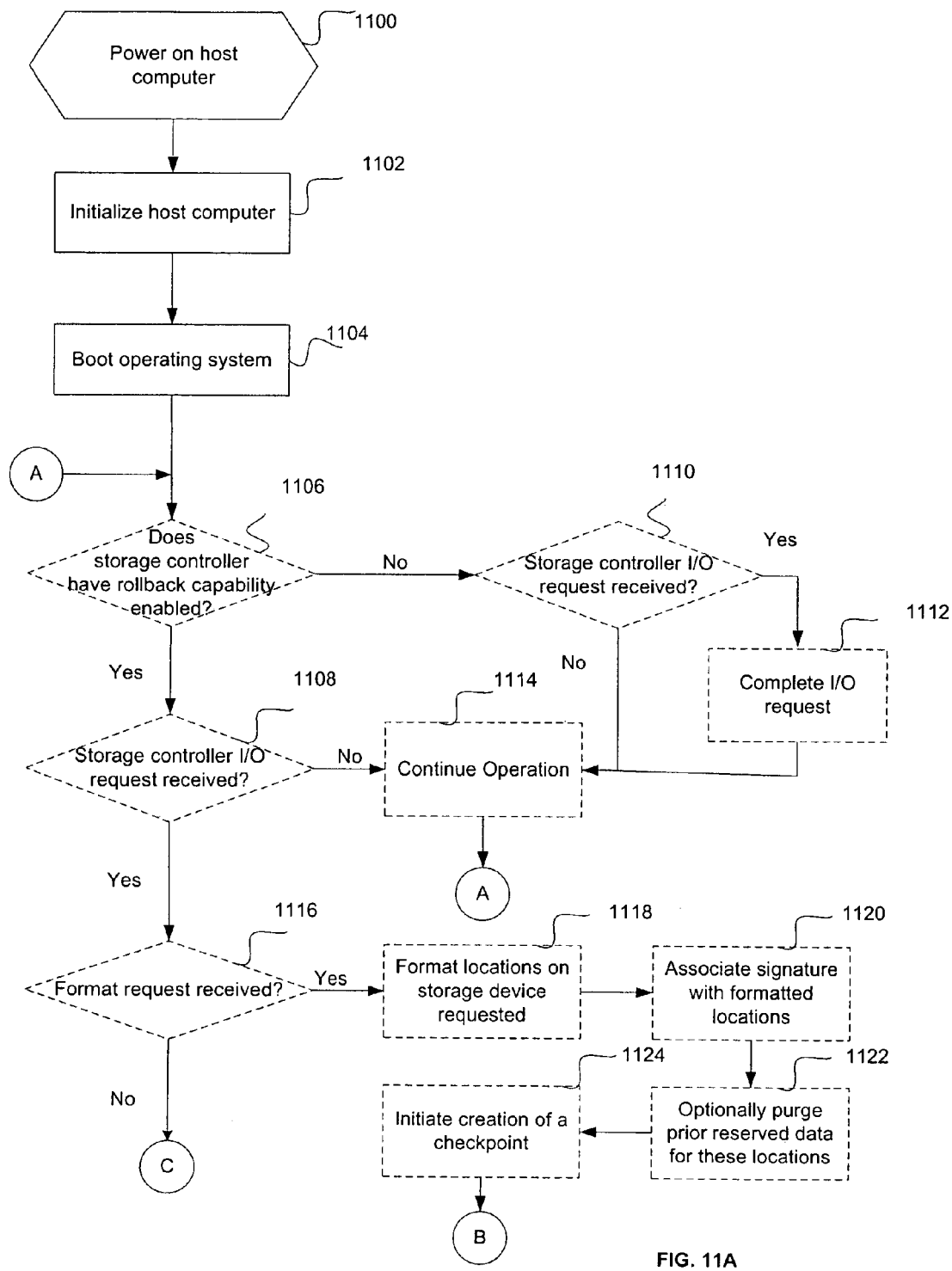
FIGS. 11A and 11B illustrate operations to process checkpoint creation and restoration in accordance with embodiments.
Figure 11B:
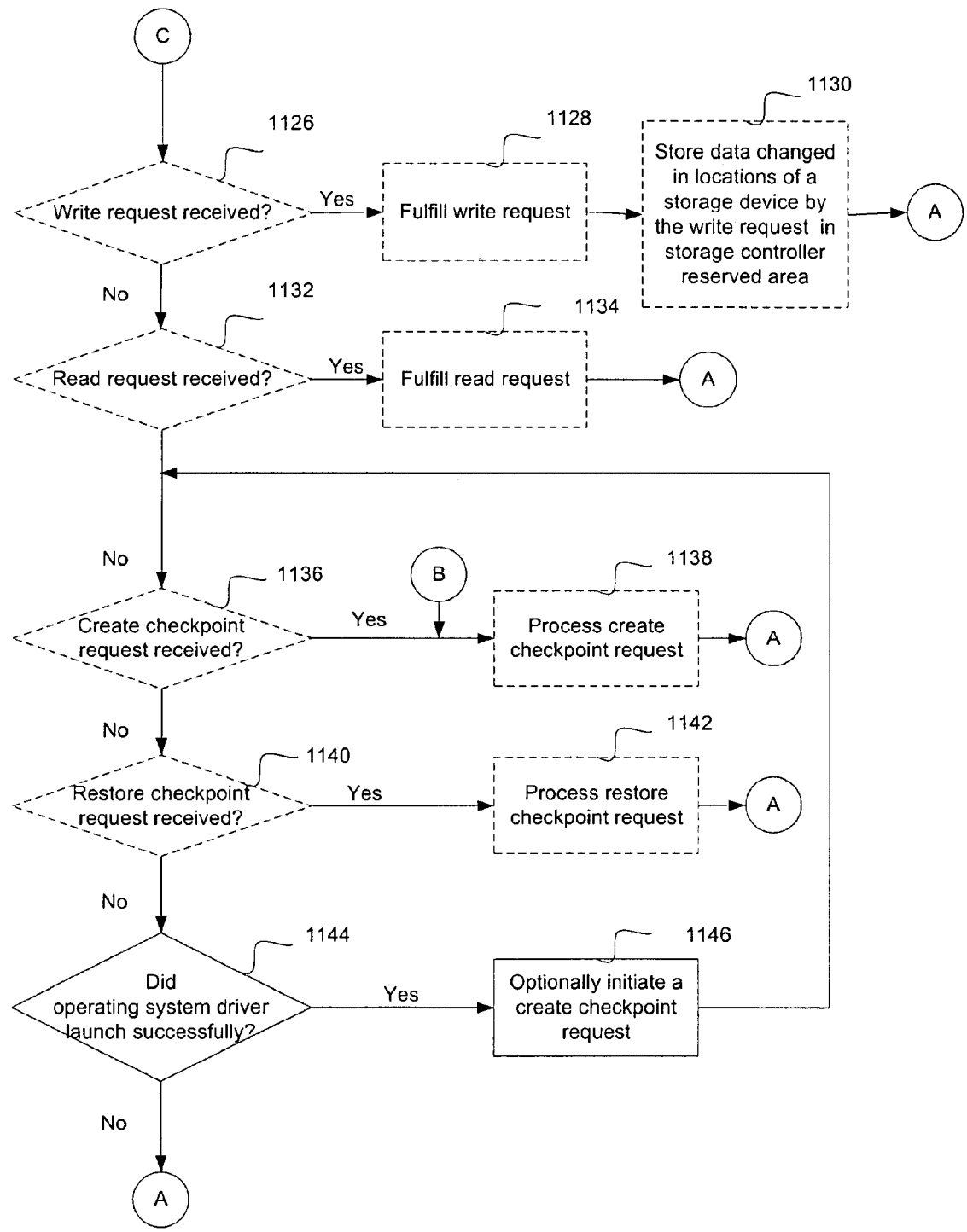

FIGS. 11A and 11B illustrate operations to process checkpoint creation and restoration in accordance with embodiments. FIG. 11 illustrates a relationship between FIG. 11A and FIG. 11B. As illustrated in FIG. 11, processing moves from FIG. 11A to FIG. 11B and may return from FIG. 11B. In FIGS. 11A and 11B, solid lines for blocks are used to indicate that processing is performed by an operating system driver 111 or a computer system 103, while dashed lines for blocks are used to indicate that processing is performed by the checkpoint system 219.

In FIG. 11A, control begins at block 1100 with the host computer 103 being powered on. In block 1102, the host computer 103 is initialized. For example, during initialization, the checkpoint system 219 is launched. In block 1104, the operating system 110 is booted.

In block 1106, the checkpoint system 219 determines whether the storage controller 218 has rollback capability enabled. If so, processing continues to block 1108, otherwise, processing continues to block 1110. When the rollback capability is not enabled, in block 1110, the checkpoint system 219 determines whether a storage controller I/O request has been received. If so, processing continues to block 1112, otherwise processing continues to block 1114. In block 1112, the I/O request is completed. In block 1114, operation of the storage controller 218 is continued. From block 1114, processing continues to block 1106 (FIG. 11A).

When the rollback capability is enabled, in block 1108, the checkpoint system 219 determines whether a storage controller I/O request has been received. If so, processing continues to block 1116, otherwise, processing continues to block 1114. In block 1116, the checkpoint system 219 determines whether a format request has been received. If so, processing continues to block 1118, otherwise, processing continues to block 1126 (FIG. 11B).

In block 1118, the checkpoint system 219 formats locations (e.g., a logical block address (LBA) range) on a storage device requested. In block 1120, the checkpoint system 219 associates a signature with the formatted locations (e.g., the LBA location range). In block 1122, the checkpoint system 219 optionally purges prior reserved data that has been stored in the storage controller reserved area 340 for these locations. In block 1124, the checkpoint system 219 initiates creation of a checkpoint. From block 1124, processing continues to block 1138 (FIG. 11B).

In block 1126, the checkpoint system 219 determines whether a write request was received. If so, processing continues to block 1128, otherwise, processing continues to block 1132. In block 1128, the checkpoint system 219 fulfills the write request. In block 1130, the checkpoint system 219 stores data changed in locations of a storage device (e.g., in partition 310 of storage device 300) by the write request in a storage controller reserved area 340. For example, the checkpoint system stores data for changed locations (i.e., changed in the storage device) in the storage controller reserved area 340. From block 1130, processing continues to block 1106 (FIG. 11A).

In block 1132, the checkpoint system 219 determines whether a read request was received. If so, processing continues to block 1134, otherwise, processing continues to block 1136. In block 1134, the checkpoint system 219 fulfills the read request. From block 1134, processing continues to block 1106 (FIG. 11A).

In block 1136, the checkpoint system 219 determines whether a create checkpoint request was received. If so, processing continues to block 1138, otherwise, processing continues to block 1140. In block 1138, the checkpoint system 219 processes the create checkpoint request. Further details of this processing are described with reference to FIG. 12. From block 1138, processing continues to block 1106 (FIG. 11A).

In block 1140, the checkpoint system 219 determines whether a restore checkpoint request was received. If so processing continues to block 1142, otherwise, processing continues to block 1144. In block 1142, the checkpoint system 219 processes the restore checkpoint request. Further details of this processing are described with reference to FIG. 13. From block 1142, processing continues to block 1106 (FIG. 11A).

In block 1144, the operating system driver 111 determines whether it (i.e., the operating system driver 111) launched successfully. If so, processing continues to block 1146, otherwise, processing continues to block 1106 (FIG. 11A). In block 1146, the operating system driver optionally initiates a create checkpoint request and processing continues to block 1136.

Figure 12:
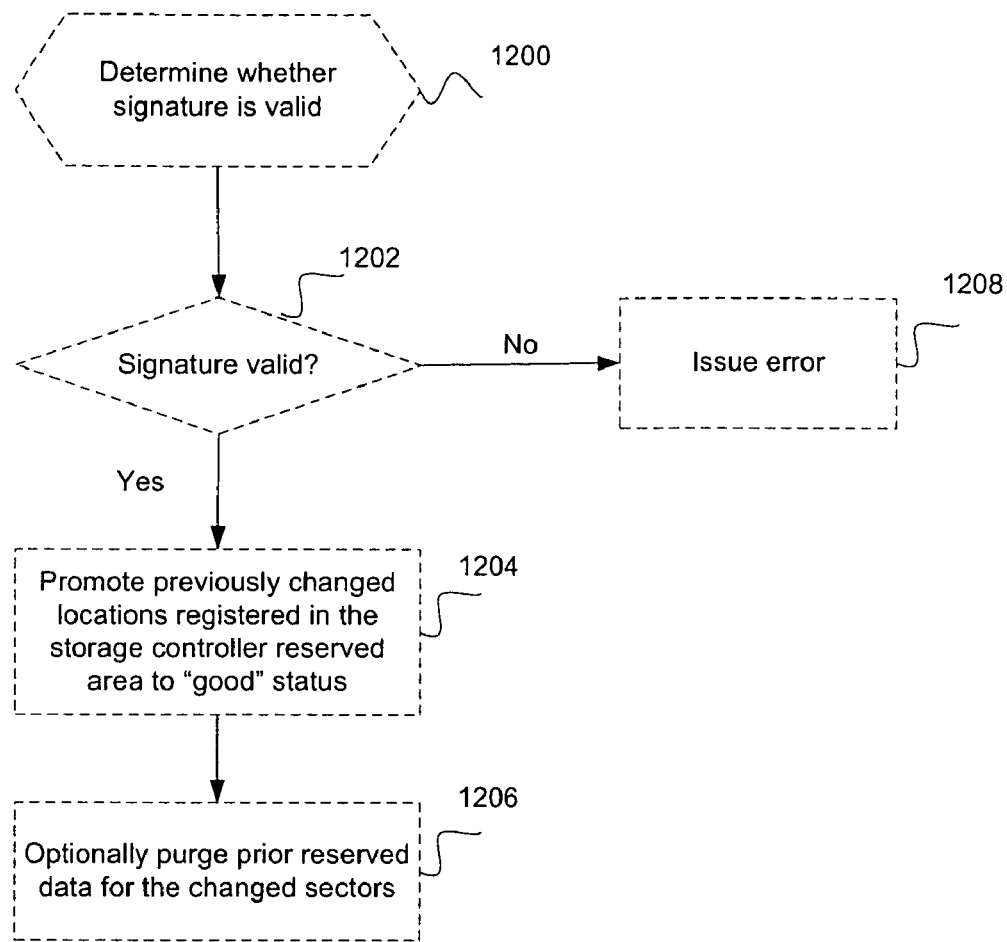
FIG. 12 illustrates operations to process a create checkpoint request in accordance with embodiments.

FIG. 12 illustrates operations to process a create checkpoint request in accordance with embodiments. Control begins at block 1200 with the checkpoint system 219 determining whether a signature received with the create checkpoint request is valid. In block 1202, if the signature is valid, processing continues to block 1204, otherwise, processing continues to block 1208. In block 1204, the checkpoint system 219 promotes previously changed locations registered in the storage controller reserved area to "good" status. In block 1206, the checkpoint system 219 optionally purges prior reserved data that has been stored in the storage controller reserved area 340 for the promoted locations. In block 1208, because the signature was invalid, an error issued. Thus, if the signature is invalid, no promotion and/or purging of data occurs, and a checkpoint may not be created. By use of the signature, embodiments prevent rogue application programs from proliferating unwanted and/or excessive checkpoints that use up resources.

Figure 13:
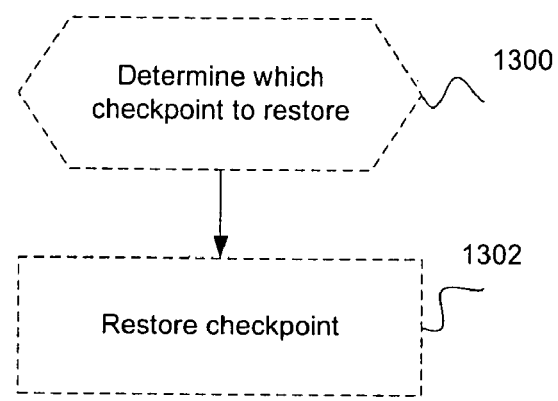
FIG. 13 illustrates operations to process a restore checkpoint request in accordance with embodiments.

FIG. 13 illustrates operations to process a restore checkpoint request in accordance with embodiments. Control begins at block 1300 with the checkpoint system 219 determining which checkpoint is to be restored. In certain embodiments, the restore checkpoint request specifies a checkpoint. In particular, each checkpoint may have an identifier, timestamp, or other characteristic that enables selection of a particular checkpoint. In certain embodiments, the identifier, timestamp, or other characteristic may be assigned to a checkpoint by the checkpoint system 219, and in other embodiments, the assignment is by a user. In certain embodiments, the checkpoint system 219 provides a user with a list of checkpoints (e.g., via a GUI) and allows selection of one of the checkpoints for restoration. In block 1302, the checkpoint system 219 restores the checkpoint. In certain embodiments, the checkpoint is restored by copying data to locations of a storage device based on data stored in the storage controller reserved area 340.

Thus, by enabling tracking of changes, embodiments provide for the ability to have storage controller enabled rollback of changes (e.g., changes that caused instability). This yields a universal rollback capability regardless of underlying operating system support.

Embodiments provide a technique by which a storage controller is able to maintain data and logical integrity of a computer system (e.g., host computer 103). The integrity provided by embodiments is enabled by a series of storage controller snapshots that are taken automatically so that rollback (i.e., recovery) of data to a previous point in time may be performed. The snapshots may be storage controller-induced. The rollback may be performed due to a corruption (e.g., caused by a computer virus) or failure during some type of operation (e.g., operating system, application program or driver installation, or errant or malicious operation).

Embodiments allow for the ability to have any type of software (e.g., operating system installs, driver installs, application installs, or general operation of a computer) to be run and to have rollback capability that takes care of any critical failures that may occur. By providing the rollback capability, computer system policies may be established to enable multiple-session rollbacks to occur so that the current corrupted content of a storage device may be restored with an exact copy of data that was present "n" number of re-boots ago. In such cases, at every reboot, a checkpoint is created and stored in a controller reserved area. Moreover, the ability to have recovery built into the computer system also helps avoid wasted time due to a computer system crash and allows the computer system to reconstruct itself automatically.

With embodiments, if a software operation and/or software installation causes a problem in a computer system, rollback may be performed, while avoiding the difficult user experience of restoring the computer system from an archive, if an archive is available.

With embodiments, the storage controller provides recovery of a previously known good environment for a storage device (e.g., a disk) to avoid system corruption due to problematic software or other incompatibilities. Also, the storage controller is able to journal changes for any aspect of an operating system installation and operation and allows rollback for any of these changes.

Intel is a registered trademark or common law mark of Intel Corporation in the United States and/or other countries. Microsoft and Windows are registered trademarks or common law marks of Microsoft Corporation in the United States and/or other countries.

Additional Embodiment Details

The described embodiments may be implemented as a method, apparatus or article of manufacture using programming and/or engineering techniques to produce software, firmware, hardware, or any combination thereof. The term "article of manufacture" and "circuitry" as used herein refers to a state machine, code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. When the code or logic is executed by a processor, the circuitry may include the medium including the code or logic as well as the processor that executes the code loaded from the medium. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration, and that the article of manufacture may comprise any information bearing medium known in the art. Additionally, the devices, adaptors, etc., may be implemented in one or more integrated circuits on the adaptor or on the motherboard.

The illustrated operations of FIGS. 11-13 show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or limiting. Many modifications and variations are possible in light of the above teachings.

What is claimed is:

1. A method for restoring data, comprising:
    formatting locations in a storage device;
    associating a signature with the formatted locations;
    storing changed data in a storage controller reserved area, wherein the changed data is changed in the formatted locations of the storage device in response to a write request;
    in response to receiving a create checkpoint request,
        in response to determining that the create checkpoint request was received with the signature associated with the formatted locations,
            promoting the data changed to a good status; and
            associating a characteristic with the promoted data to identify the promoted data as a checkpoint;
    storing additional changed data in the storage controller reserved area; and
    in response to receiving a restore checkpoint request with the signature associated with the formatted locations, restoring data in the storage device to reflect the data promoted to the good status, wherein the additional data has not been promoted to the good status.

2. The method of claim 1, wherein the data is changed in locations of a storage device in response to receiving a write request, and further comprising:
    fulfilling the write request.

3. The method of claim 1, further comprising:
    purging prior reserved data from the storage controller reserved area for the changed data.

4. The method of claim 1, further comprising:
    in response to determining that a signature received with the create checkpoint request is invalid,
    issuing an error in response to receiving the create checkpoint request.

5. The method of claim 1, further comprising:
    in response to receiving the restore checkpoint request, determining which checkpoint is to be restored; and
        restoring the determined checkpoint by copying data from the storage controller reserved area to locations in a storage device.

6. The method of claim 1, further comprising:
    in response to receiving a read request, fulfilling the read request.

7. The method of claim 1, farther comprising:
    in response to receiving a format request,
        optionally purging prior reserved data for the locations; and
        creating a checkpoint.

8. The method of claim 1, further comprising:
determining whether rollback capability is enabled; and
in response to determining that the rollback capability is enabled, determining whether a storage controller Input/Output (I/O) request has been received.

9. The method of claim 1, further comprising:
determining whether an operating system driver launched successfully; and
in response to determining that the operating system driver launched successfully, creating a checkpoint.

10. The method of claim 1, further comprising:
powering on a host computer;
initializing the host computer;
booting an operating system; and
in response to determining that the operating system booted successfully, issuing the create checkpoint request.

11. A system for restoring data, comprising:
circuitry at a storage controller operable to:
  format locations in a storage device;
  associate a signature with the formatted locations;
  store changed data in a storage controller reserved area, wherein the changed data is changed in the formatted locations of the storage device in response to a write request;
  in response to receiving a create checkpoint request,
    in response to determining that the create checkpoint request was received with the signature associated with the formatted locations,
      promote the changed data to a good status; and
      associate a characteristic with the promoted data to identify the promoted data as a checkpoint;
  store additional changed data in the storage controller reserved area; and
  in response to receiving a restore checkpoint request with the signature associated with the formatted locations, restore data in the storage device to reflect the data promoted to the good status, wherein the additional data has not been promoted to the good status.

12. The system of claim 11, wherein the data is changed in locations of a storage device in response to receiving a write request, and wherein the circuitry is operable to: fulfill the write request.

13. The system of claim 11, wherein the circuitry is operable to:
purge prior reserved data from the storage controller reserved area for the changed data.

14. The system of claim 11, wherein the circuitry is operable to:
in response to determining that a signature received with the create checkpoint request is invalid,
issue an error in response to receiving the create checkpoint request.

15. The system of claim 11, wherein the circuitry is operable to:
in response to receiving the restore checkpoint request,
determine which checkpoint is to be restored; and
restore the determined checkpoint by copying data from the storage controller reserved area to locations in a storage device.

16. The system of claim 11, wherein the circuitry is operable to:
in response to receiving a read request, fulfill the read request.

17. The system of claim 11, wherein the circuitry is operable to:

in response to receiving a format request,
optionally purge prior reserved data for the locations; and
create a checkpoint.

18. The system of claim 11, wherein the circuitry is operable to:
determine whether rollback capability is enabled; and
in response to determining that the rollback capability is enabled, determine whether a storage controller Input/Output (I/O) request has been received.

19. The system of claim 11, wherein the circuitry is operable to:
determine whether an operating system driver launched successfully; and
in response to determining that the operating system driver launched successfully, create a checkpoint.

20. The system of claim 11, wherein the circuitry is operable to:
power on a host computer;
initialize the host computer;
boot an operating system; and
in response to determining that the operating system booted successfully, issue the create checkpoint request.

21. An article of manufacture for restoring data, wherein the article of manufacture comprises a computer readable medium storing instructions, and wherein the article of manufacture is operable to:
format locations in a storage device;
associate a signature with the formatted locations;
store changed data in a storage controller reserved area, wherein the changed data is changed in the formatted locations of the storage device in response to a write request;
in response to receiving a create checkpoint request,
  in response to determining that the create checkpoint request was received with the signature associated with the formatted locations,
    promote the changed data to a good status; and
    associate a characteristic with the promoted data to identify the promoted data as a checkpoint;
store additional changed data in the storage controller reserved area; and
in response to receiving a restore checkpoint request with the signature associated with the formatted locations, restore data in the storage device to reflect the data promoted to the good status, wherein the additional data has not been promoted to the good status.

22. The article of manufacture of claim 21, wherein the data is changed in locations of a storage device in response to receiving a write request, and wherein the article of manufacture is operable to:
fulfill the write request.

23. The article of manufacture of claim 21, wherein the article of manufacture is operable to:
purge prior reserved data from the storage controller reserved area for the changed data.

24. The article of manufacture of claim 21, wherein the article of manufacture is operable to:
in response to determining that a signature received with the create checkpoint request is invalid
issue an error in response to receiving the create checkpoint request.

25. The article of manufacture of claim 21, wherein the article of manufacture is operable to:
in response to receiving the restore checkpoint request,
determine which checkpoint is to be restored; and restore the determined checkpoint by copying data from the storage controller reserved area to locations in a storage device.

26. The article of manufacture of claim 21, wherein the article of manufacture is operable to:
   in response to receiving a read request, fulfill the read request.

27. The article of manufacture of claim 21, wherein the article of manufacture is operable to:
   in response to receiving a format request,
   optional purge prior reserved data for the locations; and
   create a checkpoint.

28. The article of manufacture of claim 21, wherein the article of manufacture is operable to:
   determine whether rollback capability is enabled; and
   in response to determining that the rollback capability is enabled, determine whether a storage controller Input/Output (I/O) request has been received.

29. The article of manufacture of claim 21, wherein the article of manufacture is operable to:
   determine whether an operating system driver launched successfully; and
   in response to determining that the operating system driver launched successfully, create a checkpoint.

30. The article of manufacture of claim 21, wherein the article of manufacture is operable to:
   power on a host computer;
   initialize the host computer;
   boot an operating system; and
   in response to determining that the operating system booted successfully, issue the create checkpoint request.

* * * * *

UNITED STATES PATENT AND TRADEMARK OFFICE
CERTIFICATE OF CORRECTION

PATENT NO.         : 7,290,166 B2                                              Page 1 of 1
APPLICATION NO. : 10/902516
DATED              : October 30, 2007
INVENTOR(S)        : Michael A. Rothman and Vincent J. Zimmer It is certified that error appears in the above-identified patent and that said Letters Patent is hereby corrected as shown below:

Column 10, Line 63, delete "farther" and replace with --further--.

Signed and Sealed this

First Day of September, 2009

David J. Kappos
*Director of the United States Patent and Trademark Office*